April 7, 1959 W. A. HUBER 2,881,427
TELEVISION TRANSMISSION SYSTEM
Filed Nov. 5, 1957 3 Sheets-Sheet 1

INVENTOR,
WILLIAM A. HUBER.
BY Harry M. Saragovitz
ATTORNEY.

INVENTOR,
WILLIAM A. HUBER.
BY
Harry M. Saragovitz
ATTORNEY.

TELEVISION TRANSMISSION SYSTEM

Filed Nov. 5, 1957

3 Sheets-Sheet 3

INVENTOR,
WILLIAM A. HUBER

BY Harry M. Saragovitz
ATTORNEY 2,881,427
Patented Apr. 7, 1959

2,881,427

TELEVISION TRANSMISSION SYSTEM

William A. Huber, Spring Lake, N.J.

Application November 5, 1957, Serial No. 694,684

8 Claims. (Cl. 343—200)

(Granted under Title 35, U. S. Code (1952), sec. 266)

The invention described herein may be manufactured and used by or for the Government for governmental purposes, without the payment of any royalty thereon.

This invention relates to wide range (bandwidth) transmission systems such as television and particularly to a means of expanding television service in the very high frequency, VHF, region (approximately 30–300 mc.) of transmission with a minimum requirement for additional spectral space in this region.

The difficulty of finding adequate spectral space at frequencies furnishing effective and efficient transmission is well known, particularly where as in the case of television a fairly wide band of frequencies must be transmitted. It is an objective of the present invention to alleviate this difficulty in certain applications, those in which an occasional loss of fine picture detail caused by variations in transmission path conditions can be tolerated. Variable transmission path conditions are commonly met in mobile communications and it is with respect to wide bandwidth mobile applications such as mobile television that the present invention is particularly conceived.

In accordance with the invention the signal information such as picture or video information would be split into broad detail (low frequency variation or small bandwidth) and fine detail (high frequency variation or large bandwidth) information, and the former transmitted on a very high frequency (VHF) carrier and the latter on a high-frequency carrier, as for example, on an ultra high frequency (UHF) carrier (approximately 300–3,000 mc.). By this method of radio frequency spectrum dispersion, a greatly reduced spectral space is required in the VHF region than is required with conventional full bandwidth VHF television since, with the new system, the greater portion of the full bandwidth would be carried by a UHF carrier located in a spectral region where available frequencies are much more plentiful. At the same time the advantage of the more reliable VHF transmission, particularly where there are path obstructions preventing complete line of sight transmission, is retained insofar as a basic minimum of broad picture detail is concerned. The same technique of lower frequency spectrum conservation may, of course, be applied to applications other than television where the same general communication considerations exist.

The receiver portion of the dual transmission system contains separate high and low frequency radio frequency sections or channels, and separate automatic gain control loops are included for each channel. To provide for a precise balance between the signals finally recombined in order that the original intelligence may be accurately reproduced, a differential comparer circuit has been devised to work in conjunction with the respective automatic gain control loops. It compares the automatic gain control signal levels and modifies the high frequency channel automatic gain control bias in accordance with the differential signal derived from the differential comparer circuit to produce equal signal output as between the channels. In addition, a blanking circuit is provided which in response to a predetermined value of the differential signal will completely blank out the high frequency channel. The predetermined value would normally be set to correspond to a point at which automatic balance of the channels is impossible due to the low signal-to-noise ratio prevailing in the high frequency channel.

The features of my invention which I believe to be novel are set forth with particularity in the appended claims. The invention itself, however, both as to its organization and method of operation, together with further objects and advantages thereof, may best be understood by reference to the following description taken in conjunction with the accompanying drawings in which:

Figure 1:
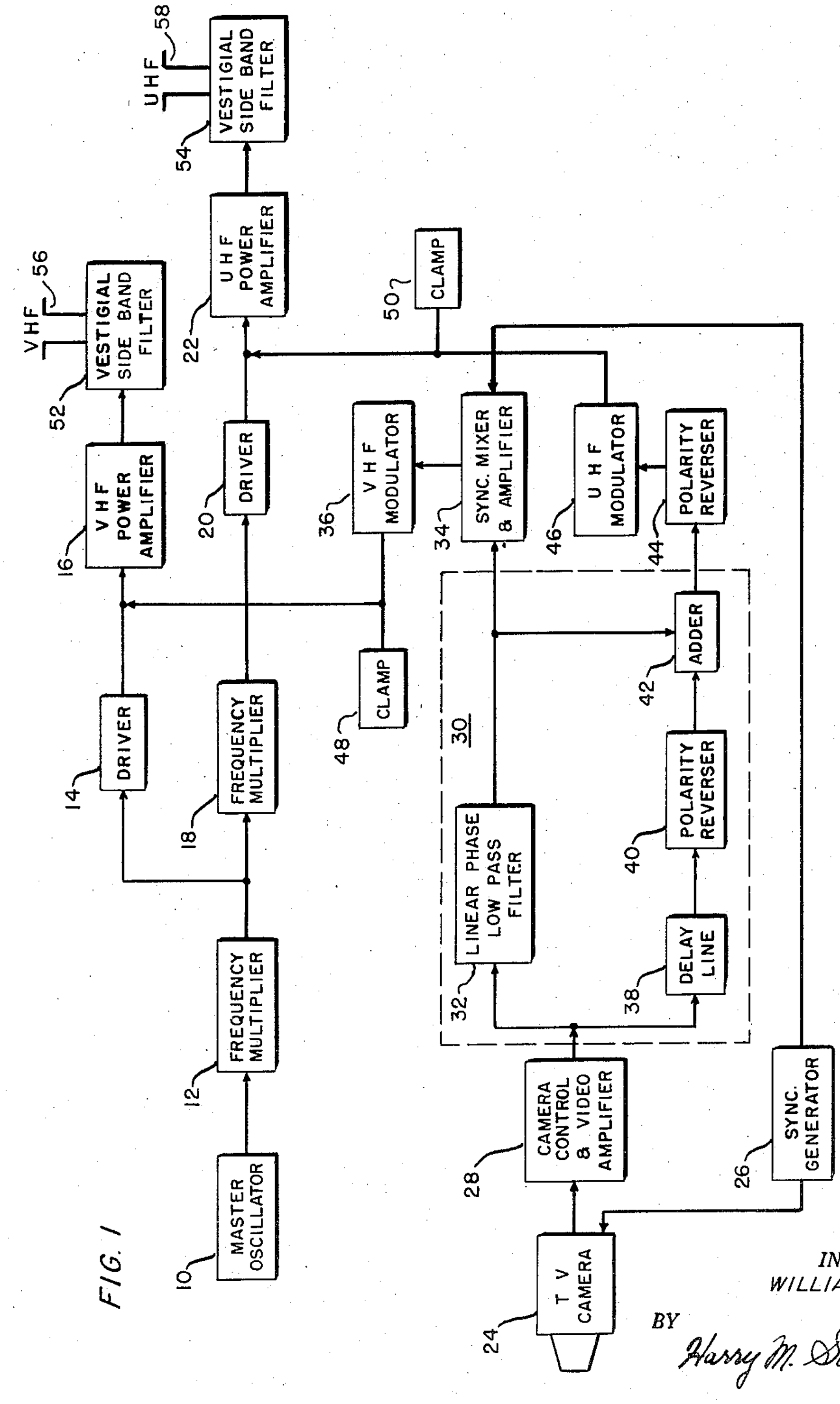
Fig. 1 is a block circuit diagram of a television transmitter constructed in accordance with the invention.

Fig. 1 shows a dual RF spectrum dispersion transmitter in which master oscillator 10 generates a basic radio frequency signal which is multiplied in frequency by a first multiplier 12 to provide a VHF carrier. This carrier is amplified in driver stage 14 and further amplified in output power amplifier 16. The output of frequency multiplier 12 is also fed to a second frequency multiplier 18 to produce a UHF carrier which is amplified in driver stage 20 and further amplified in UHF output amplifier 22. Television camera 24 in conjunction with synchronization signal generator 26 and camera control and video amplifier 28 furnishes a video signal to video signal splitter 30. As shown, the full bandwidth video signal is passed through linear-phase low-pass filter 32 to obtain the low frequency components of the video signal which, after being mixed with the synchronization signal in mixer 34, are impressed on the VHF carrier by modulator 36. A cutoff frequency for the filter 32 of between .5 and 1.0 mc. is considered practical for many applications. The high frequency components of the video signal are obtained by feeding the full wide band video signal through delay line 38 and polarity reverser 40 to adder 42, in which the full video signal is combined with the low frequency signal output from low pass filter 32. Due to the action of polarity reverser 40 the high frequency components of the wide band video signal are, in effect, derived by subtracting or cancelling the low frequency components from the full video signal frequency range. The delay line 38 compensates for the delay inherent in the low-pass filter 32 so that the low and full frequencies will be combined in adder circuit 42 in proper coincidence to produce the desired high band pass effect. The high frequency video signal from adder 42 is passed through polarity reverser 44, and by means of modulator 46 is impressed upon the UHF carrier. Clamps 48 and 50 serve as direct-current potential restorers for VHF modulator 36 and UHF modulator 46, respectively. Vestigial sideband filters 52 and 54 act respectively to eliminate, in accordance with conventional practice, the principal portion of one sideband from the VHF and UHF modulated carriers before transmission of these signals by VHF antenna 56 and UHF antenna 58.

Figure 2:
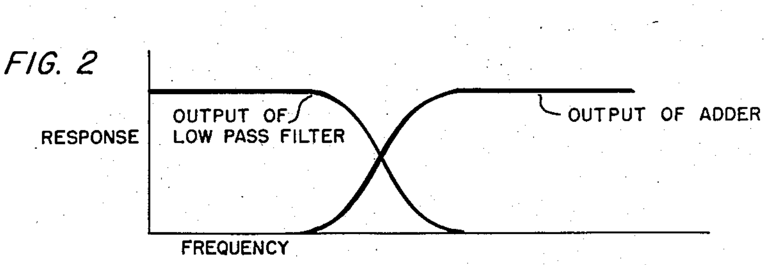
Figs. 2–3 are a group of explanatory curves.

Fig. 2 shows the relative frequency response between the video information fed to the VHF and UHF modulators, the output of the lowpass filter, illustrating the range of VHF modulating frequencies and the output of the adder illustrating the range of the UHF modulating frequencies.

Figure 3:
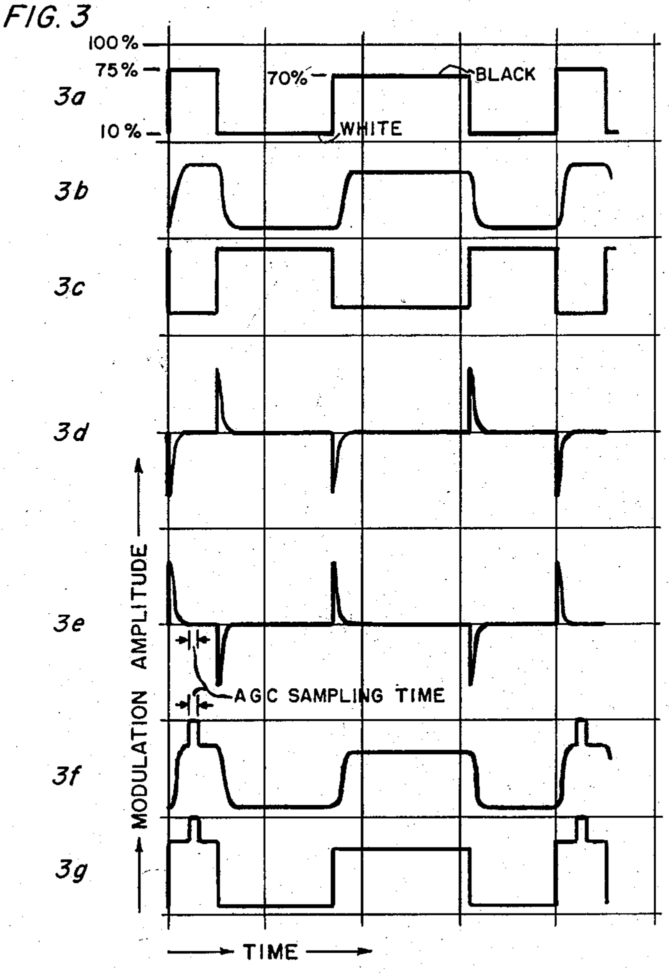

An understanding of the operation of the dual RF spectrum dispersion transmitter shown in Fig. 1 can be obtained from an analysis of the transmitter waveforms shown in Fig. 3. Fig. 3*a* shows an idealized waveform of a single horizontal line scanning a black bar on a white background which may be derived from video amplifier 28. This waveform is said to be idealized because all changes occur instantaneously i.e., the waveforms have infinite slopes. If this waveform is applied to the input of the linear phase-shift low-pass filter 32, the high frequency components will be attenuated upon passing through the filter. This will effect a rounding of the waveform slopes and is the result of the low-pass filter rejecting the high frequency components of the video signal. The waveform at the output of filter 32 will then appear as shown in Fig. 3*b*. This is the signal containing the limited resolution components that is used to modulate the VHF transmitter. Fig. 3*c* shows the output of the polarity reverser stage 40. The delay line 38 is adjusted so waveforms 3*b* and 3*c* have the proper concidence at the input of adder 42. The waveform at the output of the adder, is shown in Fig. 3*d*. These are the high frequency components contained in the original video signal, and, after inverting in reverser stage 44 to obtain the proper polarity, as shown in waveform Fig. 3*e*, they are used to modulate the UHF transmitter. The waveform appearing at the output of mixer 34 is shown in Fig. 3*f*, and is the composite low frequency video and sync signal that is used to modulate the VHF transmitter.

Figure 4:
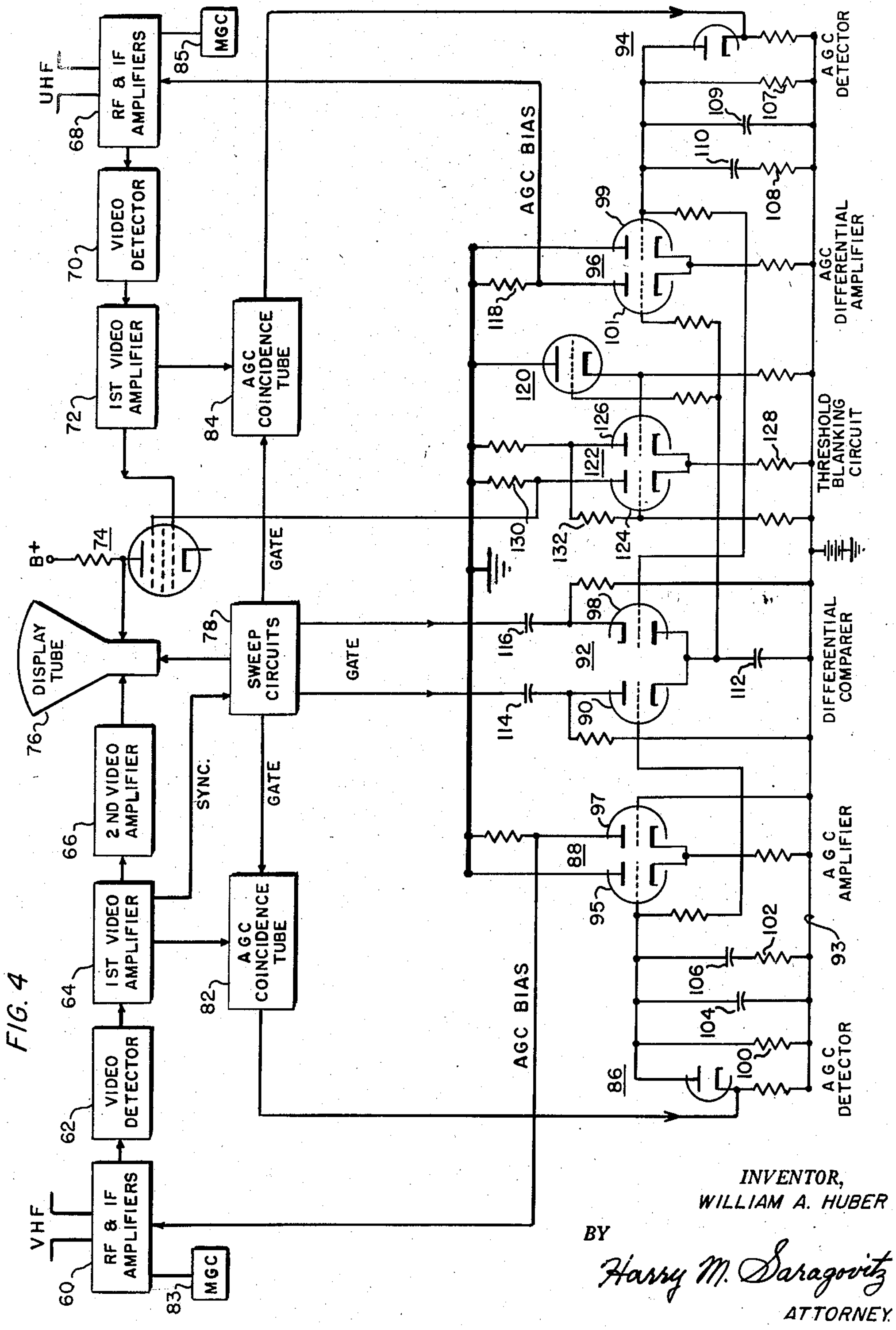
Fig. 4 is a combined block and schematic circuit diagram of a television receiver and its associated automatic gain control circuits constructed in accordance with the invention.

To simplify the explanation of the dual RF spectrum dispersion system separate and independent VHF and UHF transmitting and receiving antennas are shown in Fig. 1 and Fig. 4. It is believed possible to integrate the two transmitting antennas into a common assembly if the respective RF frequencies are chosen to have the proper harmonic relationship. This would also allow the use of a single antenna assembly at the receiver. In any event both the VHF and UHF signals are transmitted from the same location and their respective signals are received at a common remote point, therefore, conditions are favorable for a common transmission path for both RF carriers. Under these conditions, propagation time for both the VHF and UHF signals will be equal.

While the problem of time or phase difference between the received VHF and UHF signals may be substantially resolved by the existence of a common transmission path, amplitude differences remain since the propagation attenuation characteristics of VHF and UHF frequencies vary widely over the same path. It has therefore been necessary to devise an automatic gain control (AGC) at the receiver which will reestablish the original balance in amplitude between the transmitted VHF and UHF signals. Such a receiving system is shown in Fig. 4. It provides, in addition to the balancing AGC circuit, for the blanking out of the UHF signal entirely when it is so weak that the resulting signal unbalance is beyond the system limits of correction. At this point the signal-to-noise ratio in the UHF channel would be so low that channel output would serve only to degrade the picture from the VHF signal.

Referring now to Fig. 4 there is shown a portion of a television receiving circuit to which is connected a differential AGC system and blanking circuit to perform the required balancing and blanking functions. The receiving circuit consists essentially of two radio frequency receivers, one adapted to receive in the VHF range and the other in the UHF range. The VHF portion consists of RF-IF amplifiers 60, video detector 62, first video amplifier 64 and second video amplifier 66. Similarly the UHF receiver portion consists of RF-IF amplifiers 68, video detector 70, first video amplifier 72 and second video amplifier 74. The output signal of video amplifier 66 will appear as shown in waveform Fig. 3*f*, while the output of video amplifier 74 will appear as shown in waveform Fig. 3*e*. These signals are linearly added to recreate the original signal by a conventional linear amplifier (not shown) associated with display tube 76. An additional delay line may be required in one channel of the receiver to provide proper time coincidence due to unequal time delays in the divided portions of the transmitter and receiver. Sweep voltages are furnished display tube 76 by sweep circuits 78 to which are fed conventional synchronizing signal information from the first VHF video amplifier 64. Simultaneous sampling of the video signal level of both VHF and UHF receivers is obtained through respective AGC coincidence tubes 82 and 84 which are responsive to the outputs of video amplifiers 64 and 72 respectively, both AGC coincidence tubes being simultaneously gated by a signal from the sweep circuits 78. A flyback voltage may be used for this signal. Figs. 3*e* and 3*f* show a sampling period which corresponds to the 100% modulation point on the VHF carrier and 50% modulation point on the UHF carrier. This difference in sampling levels may be compensated for by manual gain controls 83 and 85 during initial adjustment of equipment. The gated VHF channel video sample level voltage is rectified by AGC detector 86 and applied to the input of AGC amplifier 88 and control grid of a first triode 90 of a differential comparer 92. Similarly, the gated UHF channel video level voltage is rectified by AGC detector 94 and applied to the input of AGC amplifier 96 and to the control grid of a second triode 98 of differential comparer 92. Filtering of the output of detector 86 is accomplished by the R-C network consisting of resistors 100—102 and capacitors 104—106. A like network consisting of resistors 107—108 and capacitors 109—110 serves to filter the output of detector 94. AGC amplifier 88 is a two stage cathode coupled circuit employing triodes 95 and 97. Similarly AGC amplifier 96 consists of a two stage cathode coupled amplifiers employing triodes 99 and 101. The output of AGC amplifier 88 is applied to RF-IF amplifiers 60 to control the gain of the VHF channel and the output of AGC amplifier 96 is applied to RF-IF amplifiers 68 to control the gain of the UHF channel. Triodes 90 and 98, which comprise the differential comparer circuit, are oppositely poled with respect to a common reference 93, the B minus terminal for the AGC amplifiers, the cathode of triode 90 and the anode of triode 92 being connected together and to the common reference by output capacitor 112. Equal and opposite polarity gating pulses are applied from the sweep circuits 78 through capacitor 114 to the anode of triode 90 and through capacitor 116 to the cathode of triode 98, the polarity of the pulses being appropriate to produce conduction by the triodes. The gating pulses may be conveniently obtained from a sweep flyback voltage as is well known in the art.

Examining the operation of the differential comparer, it will be noted that the anode current through triode 90 will tend to charge the top plate of capacitor 112 positive with respect to the bottom plate which is connected to common reference 93, and the anode current through triode 98 will tend to charge the top plate of this capacitor negative with respect to the bottom plate. It thus follows that if both triodes 90 and 98 present an equal resistance from sweep circuit 78 to the equal amplitude pulses applied then the equal and opposite charging effects of the circuit will produce no net change in charge across capacitor 112 and the potential across the capacity will remain at zero. This will be the case when the sample video level voltages applied to the grids of the triodes 90 and 98 are equal, indicating that the VHF and UHF channels are producing balanced video signals. With this condition, the differential comparer output voltage, which is developed across capacitor 112 and applied to the control grid of the UHF AGC amplifier tube 101, will produce no effect on the UHF AGC bias. However, if the video signal levels are unbalanced there will be produced a voltage change on capacitor 112 which will result in a corrective change in the bias output of UHF AGC amplifier tube 101 necessary to bring the UHF and VHF channels into signal amplitude balance. As an illustration, assume that the signal level of the UHF channel starts to drop with respect to the VHF level. This will result in a lower value (less negative) of bias being applied to triode 98 than is applied to triode 90 and the voltage on capacitor 112 and on the grid of UHF AGC amplifier tube 101 will change in a negative direction. This will decrease the anode current through amplifier tube 101 and therefore the UHF AGC bias which is developed across anode resistor 118 will decrease (go more positive). This change in AGC bias will tend to increase the gain of the UHF, RF and IF amplifiers and thus rebalance the VHF and UHF channels.

Also connected to the capacitor output of the differential comparer is the theshold blanking circuit consisting of control tube 120 and blanking multivibrator 122. This circuit is triggered when the differential signal becomes equal to a predetermined value. Its output develops a blanking signal pulse that is applied to one grid of video amplifier 74 of the UHF channel receiver. This blanking signal is employed to block UHF video amplifier 74 whenever its associated AGC circuit is unable to retain a balanced relationship between signals in the two channels. As a result of this blanking action, whenever the signal received on the UHF channel deteriorates to where it contributes no useful information to the displayed picture it is completely cutoff, thereby eliminating the degrading effects of noise from this channel. Transients due to the blocking and opening of the UHF receiver are minimized by performing these functions during normal picture blanking time. As shown blanking is accomplished by a control potential applied to the suppressor grid of video amplifier 74. It is possible, of course, to utilize other elements of this tube for blanking purposes.

For normal amplification by video amplifier 74, the suppressor grid is operated at ground potential. Under conditions of VHF and UHF signal balance, capacitor 112 has zero charge, so that the grid of tube 120 is approximately at cathode return potential. Tube 120 is, therefore, fully conducting. Under these conditions, the cathode of tube 120 is positive with respect to its return. This positive cathode potential is applied directly to the grid of tube 126 resulting in maximum current flow in this tube. The current flow attributed to tube 126 through common cathode resistor 128 is sufficient to cut off the plate current of tube 124 and thus normally bias the suppressor grid of tube 74 at a zero bias point to allow normal amplification by tube 74.

When the received UHF signal strength becomes sufficiently less than the received VHF signal strength, a negative charge will be placed on capacitor 112 causing a decrease in the plate current flow of tube 120. This will increase the negative bias on tube 126 to the extent where it will cause tube 124 to become conductive and a negative cutoff bias to be applied to the suppressor grid of tube 74 and tube 74 will cease functioning.

The transition of tube 126 from conducting to cutoff and the tube 124 from cutoff to conducting, occurs very rapidly when the critical potential is reached on capacitor 112 because of the regenerative action between tube 124 and tube 126 through common cathode resistor 128 and feedback resistor 132. If at some instant later, the VHF and UHF signals become sufficiently balanced, the negative potential on capacitor 112 will fall and the conduction cutoff cycle of tubes 124 and 126 will revert to their original status. This will again place video amplifier tube 74 in a normal amplifying condition.

What is claimed is:

1. A radio communications system comprising a dual channel transmitter and dual channel receiver, said transmitter comprising means for generating a first radio carrier substantially within the very high frequency range, means for generating a second radio carrier of a frequency higher than said first radio carrier, means for generating a band of modulating frequencies, means responsive to said last named means for dividing said band of frequencies into high and low frequency groups, means for modulating said first radio carrier by said low frequency group, and means for modulating said second radio carrier by said high frequency group; said receiver comprising first and second signal channels adapted to receive said first and second carriers, respectively, each of said channels comprising amplification means, means for balancing the outputs of said first and second channel amplification means, said means for balancing comprising means for obtaining simultaneously a first sample of the output of said first channel amplification means and a second sample of the output of said second channel amplification means, first and second automatic gain control means, said first gain control means comprising means responsive to said first sample output for applying an automatic gain control bias to said first channel amplification means, said second gain control means comprising means responsive to said second sample output for applying an automatic gain control bias to said second channel amplification means, a differential comparer responsive to signals from said first and second automatic gain control means for deriving a differential voltage the polarity of which is dependent upon which of said gain control signals is greater and the magnitude of said differential voltage being proportional to the magnitude of the difference between the gain control signals, said differential voltage being applied to said second automatic gain control means to modify the second gain control means output bias to equalize the output of said channels.

2. The communications system set forth in claim 1 further comprising a blanking circuit means responsive to a predetermined value of said differential voltage for blocking the output from said second channel amplification means.

3. The communications system set forth in claim 2 wherein said differential comparer comprises first and second sources of signal pulses, said pulses being equal and opposite, first and second variable resistance elements, and a capacitor, said capacitor being connected through said first variable resistance element to said first source and through said second variable resistance element to said second source whereby said pulse sources tend to oppositely charge said capacitor, a first control means responsive to said first gain control signal for proportionally varying the resistance of said first variable resistance element, and a second control means responsive to said second gain control signal for proportionally varying the resistance of said second variable resistance element.

4. The communications system set forth in claim 3 wherein said blanking circuit means comprises a multivibrator the output of which assumes a first output voltage for input values below said predetermined value and a second output voltage for input values above said predetermined value, said second channel amplification means including a vacuum tube pentode amplifier, the output of said multivibrator being connected to the suppressor grid of said pentode amplifier to provide either a cut-off or conductive bias to said pentode amplifier.

5. The system set forth in claim 4 wherein said first variable resistance element and first control means comprise a first vacuum control tube and said second variable resistance element and second control means comprise a second vacuum control tube.

6. In a radio communications system, a first receiving channel adapted to receive a first band of frequencies; a second receiving channel adapted to receive a second band of frequencies substantially higher than said first band of frequencies; each of said channels comprising amplification means, means for balancing the output of said first and second channels, said means for balancing comprising means for obtaining simultaneously a first sample of the output of said first channel amplification means and a second sample of the output of said second channel amplification means, first and second automatic gain control means, said first gain control means comprising means responsive to said first sample output for applying an automatic gain control bias to said first channel amplification means, said second gain control means comprising means responsive to said second sample output for applying an automatic gain control bias to said second channel amplification means, a differential comparer responsive to signals from said first and second gain control means for deriving a differential voltage the polarity of which is dependent upon which of said gain control signals is greater and the magnitude of said differential voltage being proportional to the magnitude of the difference between said gain control signals, said differential voltage being applied to said second automatic gain control means to modify the second gain control means output bias to equalize the output of said channels.

7. The combination set forth in claim 6 wherein said differential comparer comprises first and second sources of signal pulses, said pulses being equal and opposite, first and second variable resistance elements, and a capacitor, said capacitor being connected through said first variable resistance element to said second source whereby said pulse sources tend to oppositely charge said capacitor, a first control means responsive to said first gain control signal for proportionally varying the resistance of said first variable resistance element, and a second control means responsive to said second gain control signal for proportionally varying the resistance of said second variable resistance element.

8. The combination set forth in claim 7 further comprising a blanking circuit means responsive to a predetermined value of said differential voltage for blocking the output from said second channel amplification means.

References Cited in the file of this patent

FOREIGN PATENTS 512,571 Great Britain ............ Sept. 20, 1939